(12) United States Patent
Ettorre et al.

(10) Patent No.: US 7,450,663 B2
(45) Date of Patent: Nov. 11, 2008

(54) INTERPOLATION FOR USE IN CHANNEL ESTIMATION

(75) Inventors: Donato Ettorre, Turin (IT); Maurizio Graziano, Turin (IT); Bruno Melis, Turin (IT); Andrea Finotello, Turin (IT); Alfredo Ruscitto, Turin (IT); Stefano Valle, Milan (IT); Lorena Simoni, Patrica (IT)

(73) Assignees: Telecom Italia S.p.A., Milan (IT); STMicroelectronics S.R.L., Agrate Brianza (IT)

( * ) Notice: Subject to any disclaimer, the term of this patent is extended or adjusted under 35 U.S.C. 154(b) by 350 days.

(21) Appl. No.: 10/508,928

(22) PCT Filed: Mar. 17, 2003

(86) PCT No.: PCT/EP03/02773

§ 371 (c)(1),
(2), (4) Date: Feb. 18, 2005

(87) PCT Pub. No.: WO03/081862

PCT Pub. Date: Oct. 2, 2003

(65) Prior Publication Data

US 2005/0153701 A1 Jul. 14, 2005

(30) Foreign Application Priority Data

Mar. 21, 2002 (EP) .................................. 02425177

(51) Int. Cl.
*H04B 1/06* (2006.01)
*H04L 5/02* (2006.01)

(52) U.S. Cl. ........................................ 375/316; 375/147
(58) Field of Classification Search .................. 375/340
See application file for complete search history.

(56) References Cited

U.S. PATENT DOCUMENTS

| | | | | |
|---|---|---|---|---|
| 5,875,215 A | * | 2/1999 | Dobrica | 375/344 |
| 5,886,911 A | | 3/1999 | Yang | 708/290 |
| 5,903,280 A | * | 5/1999 | Horiguchi | 345/501 |
| 6,141,393 A | * | 10/2000 | Thomas et al. | 375/347 |
| 2002/0006158 A1 | * | 1/2002 | Schmidl et al. | 375/150 |
| 2002/0141483 A1 | * | 10/2002 | Doetsch et al. | 375/147 |

FOREIGN PATENT DOCUMENTS

| | | |
|---|---|---|
| EP | 0 912 019 | 4/1999 |
| EP | 1 032 168 | 8/2000 |

* cited by examiner

*Primary Examiner*—Shuwang Liu
*Assistant Examiner*—David Huang
(74) *Attorney, Agent, or Firm*—Andrew Wilford

(57) ABSTRACT

A method for the estimation of the transfer function of a transmission channel in a receiving system of UMTS type envisages the computation of a plurality of channel coefficients, included among known channel coefficients corresponding to pilot symbols, through the reiteration of an interpolation algorithm, capable of calculating an intermediate point $(Z, f(Z))$ between a first extreme and a second extreme of a determined interval, the first extreme being formed by at least two known points and the second extreme being formed by at least one known point, the intermediate point to be calculated having as abscissa $(Z)$ the abscissa value of the mean point between the points defining the interval rounded off to the integer closest to the first extreme, and having as ordinate $(F(Z))$ the arithmetic average between the ordinate of the known point of the second extreme and the ordinate of a point, chosen between the two known points of the first extreme, having a distance from the intermediate point equal to the distance between the intermediate point and the known point of the second extreme.

19 Claims, 6 Drawing Sheets

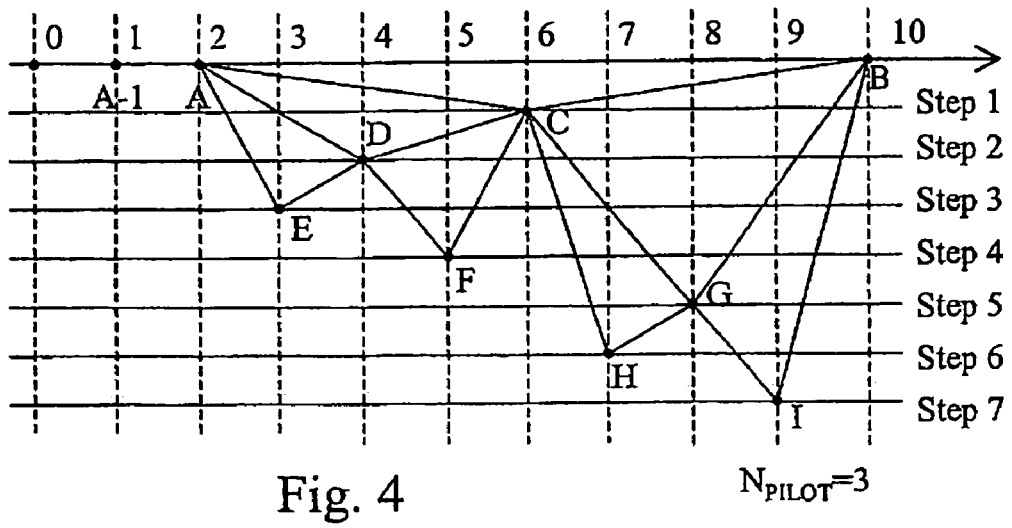
Fig. 4    $N_{PILOT}=3$
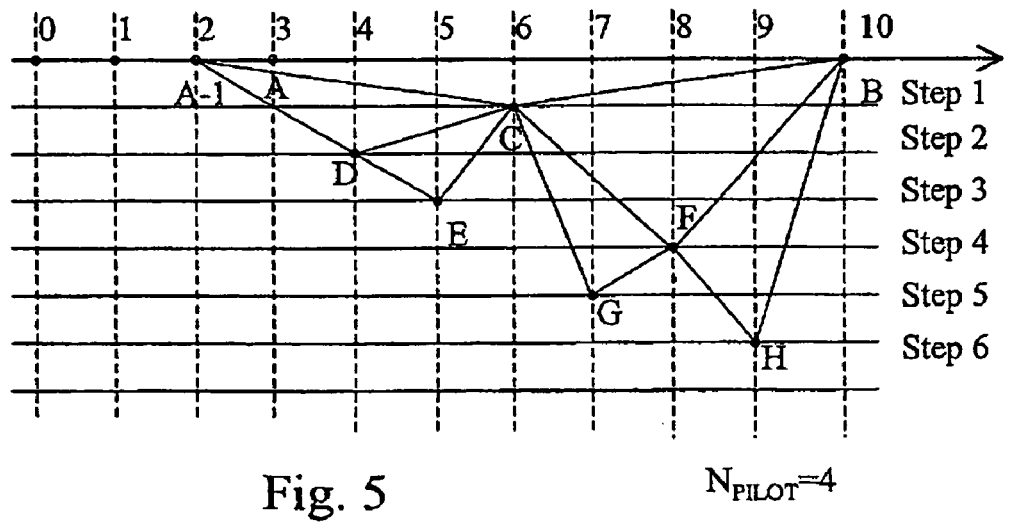
Fig. 5    $N_{PILOT}=4$
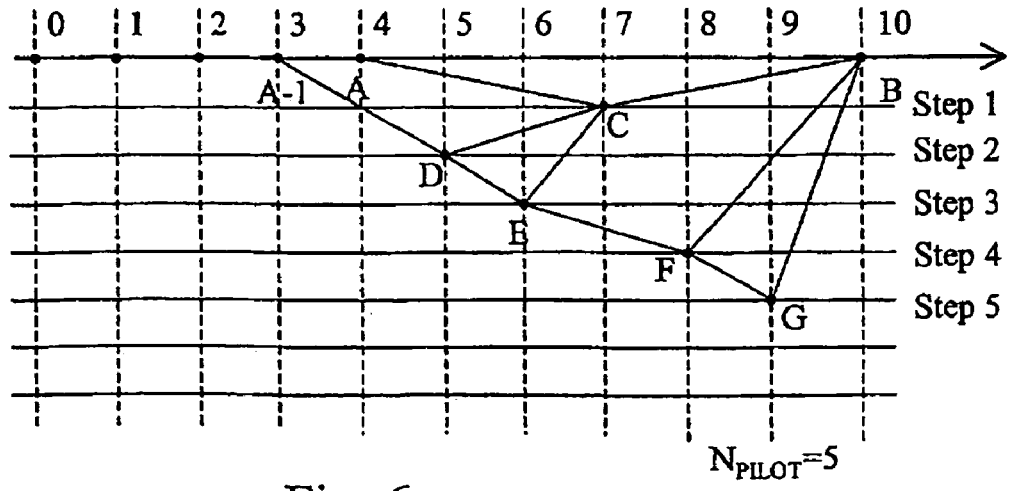
Fig. 6    $N_{PILOT}=5$

INTERPOLATION FOR USE IN CHANNEL ESTIMATION The above-identified application is the US phase of PCT Application PCT/EP03/02773 filed 17 Mar. 2003, claiming the priority of the European Application 02425177.9 itself filed on 21 Mar. 2002.

TECHNICAL FIELD

The present invention is related to telecommunications systems and in particular it concerns a method and a device for the estimation of the transfer function of a transmission channel.

BACKGROUND ART

As is well-known, one of the most used techniques in the mobile radio communication systems is the W-CDMA (Wideband-Code Division Multiple Access) technique, by virtue of its high spectral efficiency as compared to other multiple access techniques. Within said technique and in particular in the FDD (Frequency Division Duplexing) mode different solutions have been adopted to increase system capacity. Among said solutions it is worth mentioning the coherent tracking of the signal received by the radio mobile station or mobile terminal.

This type of signal tracking requires a very accurate estimation of the transfer function of the transmission channel, referenced to in the sequel as "channel estimation", in the presence of fading and multiple reflections due to user's motion in the covering area, without giving any details about a user's displacement velocity.

Like other system functions, also the channel estimation function may be assigned to processing devices (for example, DSPs, microcontrollers, etc) and in such a case this is achieved by means of software or through dedicated devices (for example FPGAs, ASICs, etc.) and therefore the implementation modality is mainly hardware based. During the definition of the telecommunications system architecture, the design engineer has to find out the best distribution of the different tasks among programmed devices and wired devices.

Thus, the different architectures achievable must then be analysed in terms of computational burden for a DSP device, traffic volume over the bus dedicated to data transfer, and the optimum distribution among hardware and software resources.

Considering by way of an example a complex system such as a modem for a UMTS base station or mobile terminal, it is evident that the communication bus between the DSP device and the hardware resources acts as a bottleneck of the system. For instance, as to a radio base station, the load of the bus becomes greater and greater as the number of users increases, and when the functions involved require the transfer between DSP and hardware resources of considerable bulks of data.

Channel estimation is one of said functionalities, since it has to be repeated for any fingers (sub-channels) of each individual user.

Let us consider the worst case in which the maximum number of users Nu=128 are communicating within a cell and each user has a finger number Nf=8 for each Rake receiver (a receiver which is typical for example of UMTS base stations). The quantity of data to be transferred for each finger in a time slot (time interval) of duration Ts=666 μs may be estimated to be equal to a number of bits NB=400. As a consequence, there will be a considerable data stream over the bus, namely:

$$Nb \cdot Nf \cdot Nu/Ts = 400 \cdot 8 \cdot 128/666 \cdot 10-6 = 615 \text{ Mbit/s}$$

As of today, various algorithms capable of performing the channel estimation are known; among them there are for instance those described in the document EP 0 912 019, wherein two different interpolation methods, the one of linear type, the other through Kalman filters, are used, the method described in the document EP 1 032 168, wherein the interpolation is performed with the method of Lagrange's polynomials, and that described in the document U.S. Pat. No. 5,886,911, in which use is made of the bi-section method.

The solutions described in the above documents have however some drawbacks and are not directly applicable to UMTS systems, such as the bi-section method, or are extremely complex for an implementation of hardware type.

Taking into account as a matter of fact, the considerable data stream already present on the bus of a base station, it should be preferred not to further overload such a bus, since this would require complex interpolation operations within the estimation of the channel, such as the operations necessary to perform an interpolation by the method of Lagrange's polynomials.

The device can be fully implemented through hardware and therefore can be easily integrated into a Rake receiver for base stations, keeping the same performance as of the software solutions based on DSP processors. Since no data transfer with the DSP processor is required, the communication bus is left free for other tasks.

A particular subject matter of the present invention are a method and a device for the estimation of the transfer function of a transmission channel, as described in the appended claims.

SUMMARY OF THE INVENTION

The method and the device subject matter of this invention make use of an algorithm of a low complexity, for the estimation of the transfer function of a transmission channel, suitable for both the transmission path toward a base station, called "up-link", and for the transmission path toward a mobile terminal, called "down-link".

The method according to the invention envisages the computation of a plurality of channel coefficients, included among known channel coefficients corresponding to pilot symbols, through the reiteration of an interpolation algorithm, capable of calculating an intermediate point between a first extreme and a second extreme of a determined interval. The first extreme is formed by at least two known points and the second extreme is formed by at least one known point.

The intermediate point to be calculated has an abscissa equal to the abscissa value of a mean point between the points defining the interval rounded off to the integer closest to the first extreme, and has an ordinate equal to the arithmetic average between the ordinate of the known point of the second extreme and the ordinate of a point, chosen between the two known points of the first extreme, having a distance from the intermediate point equal to the distance between the intermediate point and the known point of the second extreme.

BRIEF DESCRIPTION OF DRAWINGS

This and other characteristics of this invention will become evident from the following description of a preferred embodiment of the same, given by way of a non-limiting example, and from the attached drawings, wherein:

FIG. 4 is a schematic representation illustrating a sequence of operations for computing the channel coefficients through the algorithm of FIG. 3, when $N_{PILOT}=3$;

FIG. 5 is a schematic representation illustrating a sequence of operations for computing the channel coefficients through the algorithm of FIG. 3, when $N_{PILOT}=4$;

FIG. 6 is a schematic representation illustrating a sequence of operations for computing the channel coefficients through the algorithm of FIG. 3, when $N_{PILOT}=5$;

DETAILED DESCRIPTION OF THE PREFERRED EMBODIMENTS

The method and the device according to the present invention will now be described in detail with reference to the UMTS (Universal Mobile Telecommunications System) systems, relating to the up-link path in the FDD mode.

The coherent tracking for the radio interface of UMTS systems may be obtained by using time-multiplexed pilot symbols in the control channel DPCCH (Dedicated Physical Control Channel).

Figure 1:
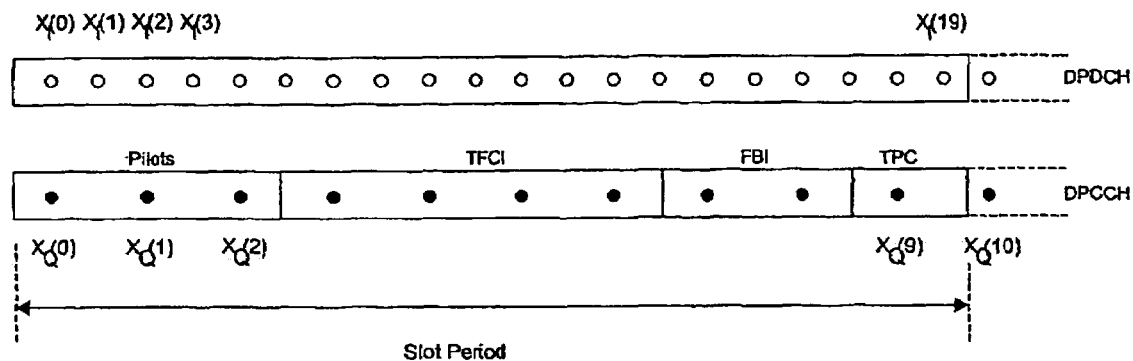
FIG. 1 is a schematic representation of the symbols of a data channel DPDCH and of a control channel DPCCH, in the case of a transmission path toward a radio mobile station.

In FIG. 1 there is schematically depicted the time relation between the symbols of the data channel DPDCH (Dedicated Physical Data Control Channel) and the symbols of control channel DPCCH in a time interval called "time slot". In the case illustrated in said figure, there are at the beginning of the slot three pilot symbols, $X_Q(0)$, $X_Q(1)$ and $X_Q(2)$, followed by other symbols used for the control, in particular four symbols TFCI (Transport-Format Combination Indicator), two FBI (Feedback Information) symbols and a TPC (Transmit Power Control) symbol.

Pilot symbols $X_Q(k)$, with $k=0, 1, 2, \ldots, N_{PILOT-1}$ (where $N_{PILOT}$ is the number of pilot symbols in the slot) are also known to the receiver which utilises such information jointly with the received symbols $Z(k)$, in order to evaluate the channel effect on each pilot symbol $X_Q(k)$.

By carrying out the complex product of the received symbol $Z(k)$ by the corresponding pilot symbol $XQ(k)$ one obtains the channel coefficients, in particular the in phase and quadrature components of the product correspond to the components $C_Q \pm C_I$ of the channel coefficients $C(k)=C_I(k)+jC_Q(k)$.

It becomes therefore evident that it is possible to estimate the channel coefficients only in relation of the pilot symbols transmitted over channel DPCCH. However, since the pilot symbols are not transmitted continuously but only in coincidence with the initial part of a time slot, performing the channel estimation requires the computation, through some form of interpolation, of the channel coefficients corresponding to the missing pilot symbols.

The number of pilot symbols within an individual slot may vary from a minimum of three to a maximum of eight; therefore the number of channel coefficients that will have to be estimated through interpolation, shall vary between seven and two, being ten the total number of symbols present in a slot of a control channel DPCCH.

Figure 2:
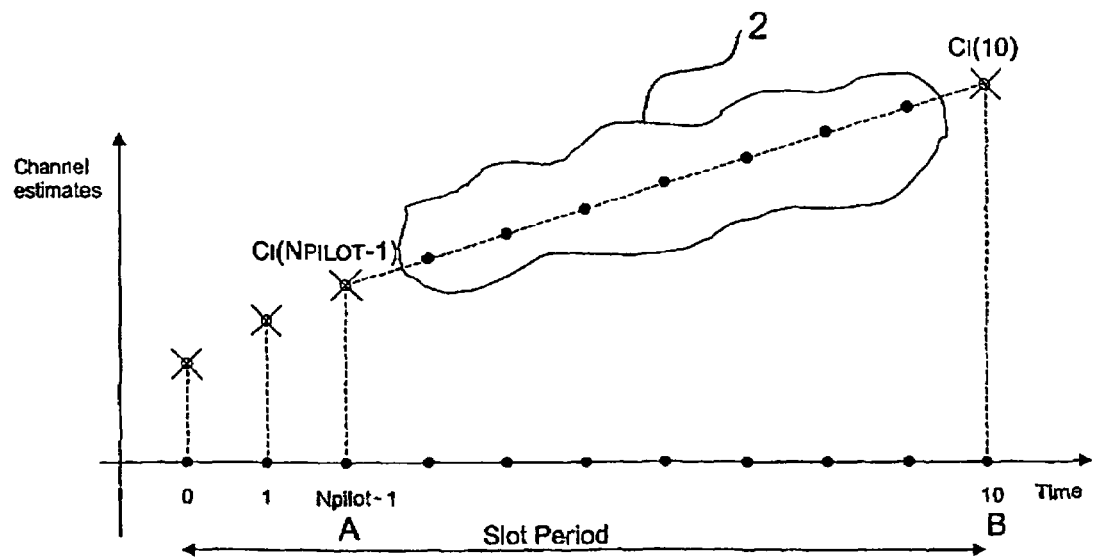
FIG. 2 is a graph illustrating a plurality of channel coefficients obtained through linear interpolation between two known channel coefficients.

FIG. 2 depicts for instance the case in which seven channel coefficients (in the figure are represented the in the phase components only), globally indicated with reference 2, have been computed through interpolation between the last coefficient $C_I(N_{PILOT}-1)$ of the current slot, corresponding to a value of abscissa value A and a first coefficient of the following slot, indicated in the figure as $C_I(10)$ and corresponding to a value of abscissa B. The pilot symbols, thus also the channel coefficients, always correspond by common assumption to integer abscissa values (0, 1, 2, 3, . . . ) on a horizontal time axis (Time).

The interpolation method and device implemented according to the present invention allow computation of the components $C_I(k) \pm C_Q(k)$ of the channel coefficients without using complex operations such as multiplication and division, but only utilising additions and divisions by two (the latter ones of easy implementation in hardware through a shift operation on the right side of a register) allowing a considerable reduction in the hardware architecture complexity of the interpolation unit.

The interpolation method according to the present invention will now be described in detail with reference to the flow chart of FIG. 3, The algorithm shown in FIG. 3 allows the computation, through interpolation of a plurality of points, included between a last channel coefficient of abscissa A, a current slot L, and a first channel coefficient of abscissa B, of a slot L+1 subsequent to said current slot. Since the minimum number of channel coefficients in each slot is equal to three, the coefficient, of abscissa A–1, immediately preceding the last channel coefficient of each slot is always known and therefore can be used for the interpolation computation.

Figure 3:
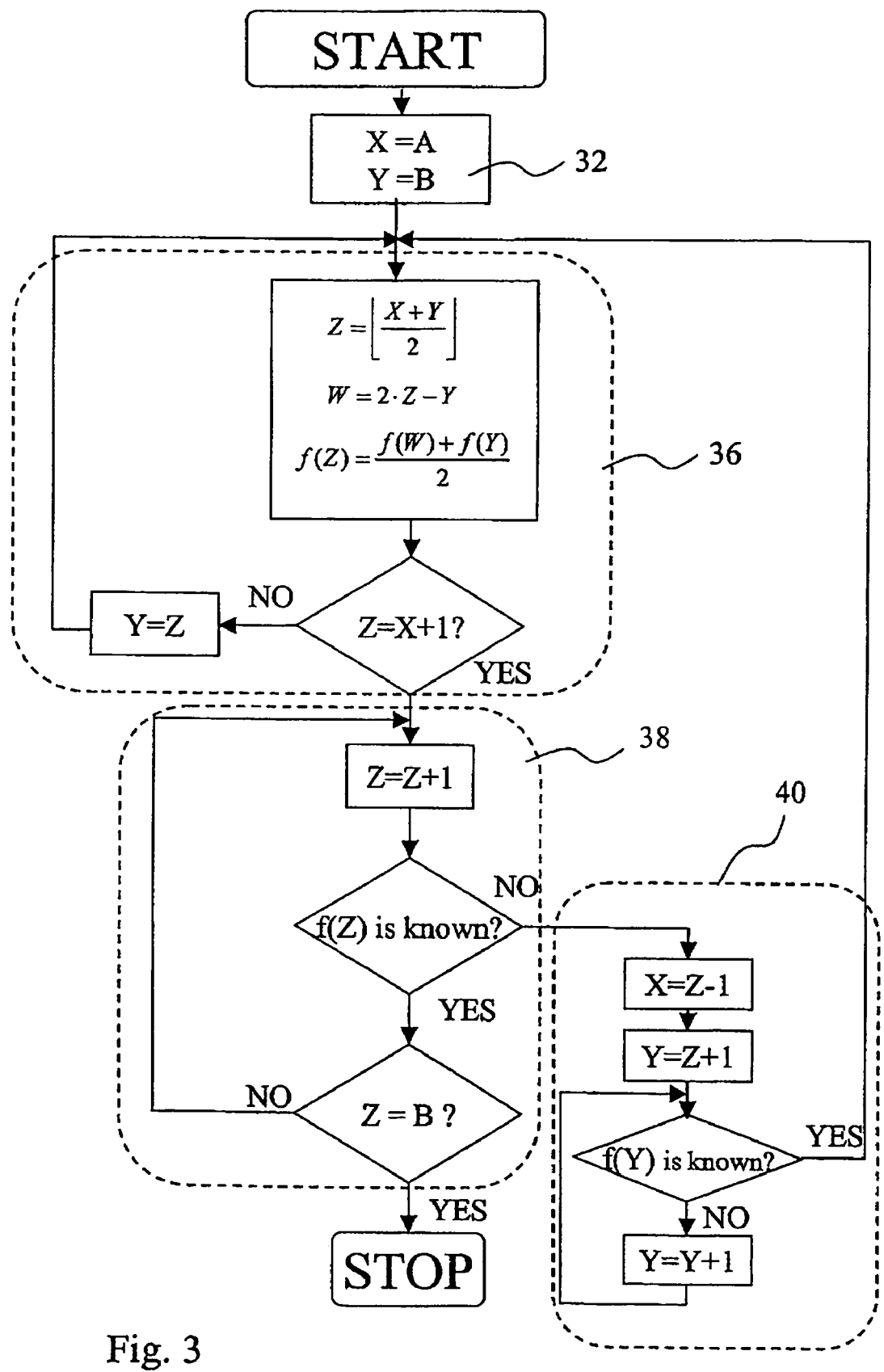
FIG. 3 is a flow chart illustrating a first interpolation algorithm implemented according to this invention.

Within the algorithm of FIG. 3 some variables, X, Y, Z, W are used with the following meaning:

X: abscissa of the known left-hand point of the interpolation interval, a value initially corresponding to A;

Y: abscissa of the known right-hand point, used for the interpolation, a value initially corresponding to B;

Z: abscissa of an intermediate point between X and Y;

W: abscissa of the extreme left point, actually used for the interpolation, corresponding, depending on the case, to point X or to point X–1;

f(k): ordinate corresponding to a generic abscissa k.

Variables X e Y are initialised as being equal to the extremes A and B in the initial block indicated by reference 32 in FIG. 3.

Subsequently in block 36 of such figure, abscissa Z is obviously calculated as an integer of the intermediate point between X an Y. The value of abscissa Z is rounded off to the lower integer through function FLOOR (symbolically indicated in the figure). In the same block the computation is made of the abscissa of the extreme left-hand point W, which will be equal either to X or to X−1, depending on whether the value of X+Y is odd or even, respectively (by applying the formula W=2·Z−Y). Then the ordinate f(Z) of the intermediate point Z is calculated by arithmetically averaging between the ordinate of the extreme left-hand point W and the ordinate of the right-hand extreme Y, which are known.

Then, still within block 36, a check is made on whether the just calculated point on abscissa Z corresponds to the abscissa point X+1. If such a condition is not met, value Z is assigned to abscissa Y of the known right-hand point, and again operations contained in block 36 are applied. In practice Block 36 algorithm is recursively applied to the half-interval at the left side of the point previously computed, until the abscissa point X+1 is attained.

Subsequently, one should consider the operations indicated as a whole with reference 38, operating by increasing abscissas, starting from the last computed point X+1, and searching a first point still to be calculated. Once such a point has been found, the operations contained in block 40 are carried out or one terminates the algorithm if the right-hand extreme B of the interpolation interval has already been reached, for all the points have already been computed.

If however a point has been found which is still to be computed and whose abscissa is equal to the value taken by variable Z, the next step is to assign to variable X the value Z−1 that represents the first known left-hand point, and to search, by subsequent attempts, for the first known right-hand point of Z, that is. the value which is assigned to variable Y. To perform the latter operation, variable Y is increased by a unit each time, until a corresponding known coefficient has been reached. These operations are carried out within block 40

With these new values of X and Y, the recursive algorithm of block 36 is again applied, and in cascade use is made of the procedure contained within block 38 for the search of a new point to be computed. If all the points have been computed, the algorithm terminates; otherwise a new X−Y interval is determined to which again recursive algorithm 36 is to apply.

The previously-mentioned algorithm, shown in FIG. 3, allows computation, exclusively by sums, divisions by two and compare operations between registers, of any number of channel coefficients contained in an interval defined on the left side by two known coefficients (of abscissa A and A−1) and on the right side by a known coefficient (of abscissa B).

For a better understanding of the general interpolation algorithm described above, we will now consider its application to six particular cases, typical of the UMTS system, from the case in which the pilot symbols ($N_{PILOT}$) are three, and the coefficients to be computed are seven, up to the case where the pilot symbols are eight and the channel coefficients to be computed are two only.

The fist case ($N_{PILOT}$=3) is schematically illustrated in FIG. 4. On the abscissa the channel coefficients are plotted corresponding to the three pilot symbols of the current slot, namely to abscissa positions 0, (A−1) and 2 (A), and to the first pilot symbol of the subsequent slot, to the abscissa position 10 (B) respectively. The channel coefficients to be computed are therefore those corresponding to the abscissa positions 3 to 9.

The interpolation operation is carried out by subsequent steps; the number of steps directly depends upon the number of channel coefficients to be computed. In case of FIG. 4 the computation is performed in seven steps (Step 1 to Step 7).

At Step 1, the algorithm of block 36 of flow chart of FIG. 3 is applied by assigning to variables X and Y the values A (which is worth 2) and B (which is worth 10), respectively:

X=A=2

Y=B=10

Thus the following is obtained:

Z=FLOOR [(2+10)/2]=6; abscissa of the intermediate point to be computed (denoted by letter C in the Figure).

W=2·6−10=2; abscissa of the left-hand extreme point, corresponding in this case to X.

Once the abscissa of the extreme left-hand point W, of the extreme right-hand point Y and of the intermediate point Z, of which the ordinate is to be computed, are known, the next operation is to calculate the value of the corresponding coefficient $C(6)=C_I(6)+jC_Q(6)$, computing the components $C_I$ e $C_Q$ by the arithmetic averaging rule (point C on the graph of FIG. 4):

$C_I(6)=[C_I(2)+C_I(10)]/2$ and $C_Q(6)=[C_Q(2)+C_Q(10)]/2$

After checking that abscissa Z of the computed point, in this case being equal to 6, still does not correspond to the point X+1=3, one assigns the value Z=6 to variable Y and determine a new coefficient (point D, step 2):

X=2; Y=6

Z=FLOOR [(2+6)/2]=4

W=2·4−6=2

$C_I(4)=[C_I(2)+C_I(6)]/2$ and $C_Q(4)=[C_Q(2)+C_Q(6)]/2$

Also in this case the output condition from block 36 is not met, since Z=4 is different from X+1=3; thus the next step is to compute a new coefficient (point E, step 3):

X=2; Y=Z=4

Z=FLOOR [(2+4)/2]=3

W=2·3−4=2

$C_I(3)=[C_I(2)+C_I(4)]/2$ and $C_Q(3)=[C_Q(2)+C_Q(4)]/2$

At this point a verification is made of condition Z=X+1 which allows passing from block 36 to block 38.

By applying the rules described within block 38, one finds the first point still to be computed on the right hand of the point of abscissa Z=3 is the abscissa point 5, then one realises that said point does correspond not to the right hand extreme B=10 and go on to block 40, having assigned value 5 to the variable Z.

Within block 40 one determines the first known left-hand point $X=Z-1=4$ and the first known right-hand $Y=6$, and with these values of X and Y one then goes back to block r 36 to calculate a new coefficient (point F, step 4):

$X=4; Y=6$ $Z=\text{FLOOR}\,[(4+6)/2]=5$ $W=2\cdot 5-6=4$ $C_I(5)=[C_I(4)+C_I(6)]/2$ and $C_Q(5)=[C_Q(4)+C_Q(6)]/2$ In this case the condition $Z=X+1$ is immediately verified, and one goes on again to block 38 where the first right-hand point still to be computed is the abscissa point $Z=7$. Within block 40, the first known left-hand point $X=Z-1=6$ and the first known right-hand point $Y=10$ are determined, and with these values of X e Y one goes back to block 36, to compute a new coefficient (point G, step 5):

$X=6; Y=10$ $Z=\text{FLOOR}\,[(6+10)/2]=8$ $W=2\cdot 8-10=6$ $C_I(8)=[C_I(6)+C_I(10)]/2$ and $C_Q(8)[C_Q(6)+C_Q(10)]/2$ Condition $Z=X+1$ is not verified; thus one remains within block 36 to calculate a new coefficient (point H, step 6):

$X=6; Y=Z=8$ $Z=\text{FLOOR}\,[(6+8)/2]=7$ $W=2\cdot 7-8=6$ $C_I(7)=[C_I(6)+C_I(8)]/2$ and $C_Q(7)=[C_Q(6)+C_Q(8)]/2$ Having reached point $Z=X+1=7$, one goes on to block 38 where it must be verified whether the right-end extreme has not yet been reached, and a determination of abscissa $Z=9$ of the next point to be calculated is to be effected. Within block 40 the first known left-hand point $X=Z-1=8$ and the first known right-hand point $Y=10$ will then be determined, and with these values of X and Y we go back to block 36 to compute a new coefficient (point I, step 7).

$X=8; Y=10$ $Z=\text{FLOOR}\,[(8+10)/2]=9$ $W=2\cdot 9-10=8$ $C_I(9)=[C_I(8)+C_I(10)]/2$ and $C_Q(9)=[C_Q(8)+C_Q(10)]/2$ Condition $Z=X+1$ has now been verified; therefore we go on to block 38 where variable X is increased to reach the value $Z=10$ which, as corresponding to the right-hand extreme B, leads to termination of the interpolation algorithm (step "STOP" in FIG. 3).

As may be derived from the above equations, all the channel coefficients have been calculated only by sums and divisions by two, i.e. operations which are easily carried out directly on hardware.

In the case ($N_{PILOT}=3$). described above, the known coefficient of abscissa $A-1$ has not been used, since the distance between points A and B is a power of 2, in particular $2^3=8$. This condition is brought about also in the case $N_{PILOT}=7$, where such distance is $2^2=4$.

The algorithm depicted in FIG. 3 allows however the computation of all the intermediate coefficients also in cases when such a distance is not a power of 2, as in the remaining cases, illustrated in the sequel.

In FIG. 5 there is depicted the case in which the pilot symbols are four ($N_{PILOT}=4$) and the coefficients to be calculated are six, from $C(4)$ to $C(9)$. The interpolation plan illustrated in FIG. 5, as will be appear from the following detailed explanation, uses the abscissa point $A-1$ as the left-hand extreme for the interpolation. Even if it introduces a slight degradation of the overall characteristics of the system, this approximation greatly simplifies the computation of the interpolated coefficients.

Let us now see how the algorithm of FIG. 3 is applied to the present case ($N_{PILOT}=4$).

As the first step, use is made the first time of algorithm of block 36 of FIG. 3 flow chart, by assigning the values of A (which is worth 3) and of B (which worth 10), to variables X and Y, respectively:

$X=A\ (A=3)$ $Y=B\ (B=10)$

Thus:

$Z=\text{FLOOR}\,[(3+10)/2]=6$; abscissa of the intermediate point to be calculated (denoted in the figure by letter C);

$W=2\cdot 6-10=2$; abscissa of the extreme left-hand point, in this case it does not correspond to X.

Once the abscissas are known of the extreme left-hand point W, the extreme right-hand point Y and the intermediate point Z of which the ordinate is to be calculated, one starts computing the value of the corresponding coefficient $C(6)=C_I(6)+jC_Q(6)$, calculating components $C_I$ e $C_Q$ by the arithmetic averaging rule (point C in the graph of FIG. 5):

$C_I(6)=[C_I(2)+C_I(10)]/2$ and $C_Q(6)=[C_Q(2)+C_Q(10)]/2$

After verifying that abscissa Z of the calculated point, in this case equal to 6, does not still correspond to point $X+1=4$, one assigns the value $Z=6$ to variable Y, and a new coefficient (point D, step 2) is computed:

$X=3; Y=6$ $Z=\text{FLOOR}\,[(3+6)/2]=4$ $W=2\cdot 4-6=2$ $C_I(4)=[C_I(2)+C_I(6)]/2$ and $C_Q(4)=[C_Q(2)+C_Q(6)]/2$ In this case the output condition of block 36 is verified, since Z=4 is equal to X+1=4; consequently one goes on to block 38.

By applying the rules described within block 38, one finds that the first point still to be calculated on the right hand of abscissa Z=4, is the abscissa point 5, verifies that such point does not correspond to the right-hand extreme B=10, and goes on within block 40 having assigned the value 5 to variable Z.

Within block 40, one will determine the first known left-hand X=Z−1=4 and the first known right hand point Y=6, and with these values of X and Y around block 36 where a new coefficient (point E, step 3) is computed.

$X=4; Y=6$ $Z=\text{FLOOR }[(4+6)/2]=5$ $W=2\cdot 5-6=4$ $C_I(5)=[C_I(4)+C_I(6)]/2$ and $C_Q(5)=[C_Q(4)+C_Q(6)]/2$ At this point the condition Z=X+1 must be verified that allows passing from block 36 to block 38.

By applying the rules described within block 38, one finds that the first point still to be calculated on the right-hand of abscissa point Z=5 is the abscissa point 7, verifies that such point does not correspond to the right-hand extreme B=10, and goes on within block 40, having assigned the value 7 to variable Z.

Within block 40, the first known left-hand point X=Z−1=6 and the first known right-hand point Y=10 are determined, and with these values of X and Y one returns to block 36 to calculate a new coefficient (point F, step 4):

$X=6; Y=10$ $Z=\text{FLOOR }[(6+10)/2]=8$ $W=2\cdot 8-10=6$ $C_I(8)=[C_I(6)+C_I(10)]/2$ and $C_Q(8)=[C_Q(6)+C_Q(10)]/2$ Condition Z=X+1 is not verified, therefore one remains within block 36 to calculate a new coefficient (point G, step 5):

$X=6; Y=Z=8$ $Z=\text{FLOOR }[(6+8)/2]=7$ $W=2\cdot 7-8=6$ $C_I(7)=[C_I(6)+C_I(8)]/2$ and $C_Q(7)=[C_Q(6)+C_Q(8)]/2$ In this case condition Z=X+1 is immediately verified, and one returns to block 38 and finds out that the first right-hand point still to be calculated is the abscissa point Z=9. Within block 40 the first known left-hand point X=Z−1=8 and the first known right-hand point Y=10 are determined, and with these values of X and Y one returns to block 36 to compute a new coefficient (point H, step 6):

$X=8; Y=10$ $Z=\text{FLOOR }[(8+10)/2]=9$ $W=2\cdot 9-10=8$ $C_I(9)=[C_I(8)+C_I(10)]/2$ and $C_Q(9)=[C_Q(8)+C_Q(10)]/2$ Condition Z=X+1 is now verified; therefore one goes on to block 38 where variable Z is increased passing to value Z=10, which, corresponding to the right-hand extreme Y, leads to terminate the interpolation algorithm (step STOP in FIG. 3).

FIG. 6 illustrates the case where each slot contains five pilot symbols ($N_{PILOT}=5$), and the number of channel coefficients to be calculated is five. This operation is performed using both coefficient C(4) corresponding to both the last pilot symbol and coefficient C(3) corresponding to the last but one pilot symbol. Also in this case the approximation introduces a slight degradation in the overall characteristics of the system; however, the computation of the interpolated coefficients is on the other hand greatly simplified.

The five steps required for the calculation of the five coefficients will be now described in a shortened way, giving the values taken by the variables, since the application methodology of the algorithm of FIG. 3 is equivalent to the one described with reference to the previous cases.

As a first step, coefficient C(7) (point C, step 1) is calculated:

$X=4; Y=10$ $Z=\text{FLOOR }[(4+10)/2]=7$ $W=2\cdot 7-10=4$ $C_I(7)=[C_I(4)+C_I(10)]/2$ and $C_Q(7)=[C_Q(4)+C_Q(10)]/2$ In the step 2, coefficient C(5) (point D, step 2) is calculated:

$X=4; Y=7$ $Z=\text{FLOOR }[(4+7)/2]=5$ $W=2\cdot 5-7=3$ $C_I(5)=[C_I(3)+C_I(7)]/2$ and $C_Q(5)=[C_Q(3)+C_Q(7)]/2$ In step 3, coefficient C(6) (point E, step 3) is calculated:

$X=5; Y=7$ $Z=\text{FLOOR }[(5+7)/2]=6$ $W=2\cdot 6-7=5$ $C_I(6)=[C_I(5)+C_I(7)]/2$ and $C_Q(6)=[C_Q(5)+C_Q(7)]/2$ In step 4, coefficient C(8) (point F, step 4) is calculated:

$$X=5; Y=10$$

$$Z=\text{FLOOR } [(7+10)/2]=8$$

$$W=2\cdot 8-10=6$$

$$C_I(8)=[C_I(6)+C_I(10)]/2$$

and $$C_Q(8)=[C_Q(6)+C_Q(10)]/2$$

In step five, coefficient C(9) (point G, step 5) is calculated:

$$X=8; Y=10$$

$$Z=\text{FLOOR } [(8+10)/2]=9$$

$$W=2\cdot 9-10=8$$

$$C_I(9)=[C_I(8)+C_I(10)]/2$$

and $$C_Q(9)=[C_Q(8)+C_Q(10)]/2$$

Also in this case the five coefficients C(5) . . . C(9) have been obtained exclusively performing additions and divisions by two.

Figure 7:
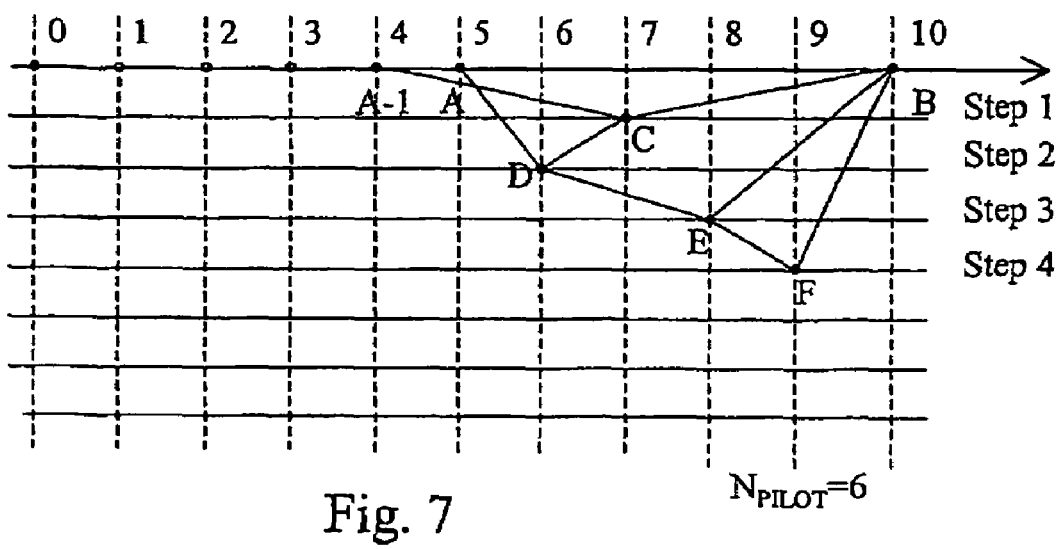
FIG. 7 is a schematic representation illustrating a sequence of operations for computing the channel coefficients through the algorithm of FIG. 3, when $N_{PILOT}=6$.

The case in which each slot contains six pilot symbols ($N_{PILOT}=6$) and the number of channel coefficients to be calculated is equal to four, is instead illustrated in FIG. 7. Also in this case use is made of both the coefficient C(5), corresponding to the last pilot symbol, and the coefficient C(4), corresponding to the last-but-one pilot symbol.

The interpolation plan of FIG. 7 is based on four consecutive steps, summarised hereinafter:

As a first step, coefficient C(7) (point C, step 1) is calculated:

$$X=5; Y=10$$

$$Z=\text{FLOOR } [(5+10)/2]=7$$

$$W=2\cdot 7-10=4$$

$$C_I(7)=[C_I(4)+C_I(10)]/2$$

and $$C_Q(7)=[C_Q(4)+C_Q(10)]/2$$

In step 2, 1 coefficient C(6) (point D, step 2) is calculated:

$$X=5; Y=7$$

$$Z=\text{FLOOR } [(5+7)/2]=6$$

$$W=2\cdot 6-7=5$$

$$C_I(6)=[C_I(5)+C_I(7)]/2$$

and $$C_Q(6)=[C_Q(5)+C_Q(7)]/2$$

In step 3, coefficient C(8) (point E, step 3) is calculated:

$$X=7; Y=10$$

$$Z=\text{FLOOR } [(7+10)/2]=8$$

$$W=2\cdot 8-10=6$$

$$C_I(8)=[C_I(6)+C_I(10)]/2$$

and $$C_Q(8)=[C_Q(6)+C_Q(10)]/2$$

In step 4, coefficient C(9) (point F, step 4) is calculated:

$$X=8; Y=10$$

$$Z=\text{FLOOR } [(8+10)/2]=9$$

$$W=2\cdot 9-10=8$$

$$C_I(9)=[C_I(8)+C_I(10)]/2$$

and $$C_Q(9)=[C_Q(8)+C_Q(10)]/2$$

Also in this case the operations are carried out exclusively through additions and divisions by two.

Figure 8:
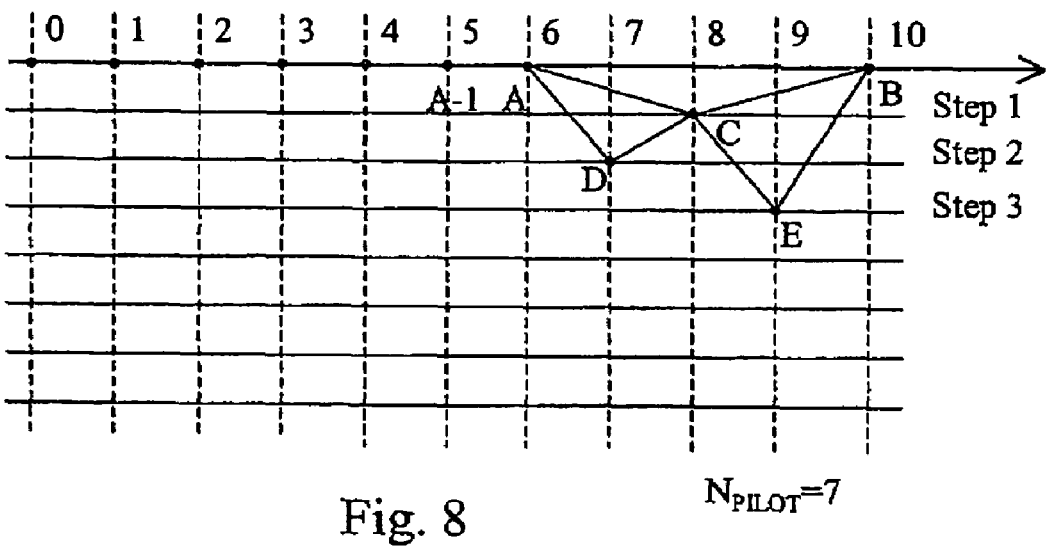
FIG. 8 is a schematic representation illustrating a sequence of operations for computing the channel coefficients through the algorithm of FIG. 3, when $N_{PILOT}=7$.

In FIG. 8 there is illustrated the case in which the slot contains seven pilot symbols ($N_{PILOT}=7$), and the number of channel coefficients to be calculated is equal to three. The operation is performed in three steps using the C(6) coefficient corresponding to the last pilot symbol.

As a first step, coefficient C(8) (point C, step 1) is calculated:

$$X=6; Y=10$$

$$Z=\text{FLOOR } [(6+10)/2]=8$$

$$W=2\cdot 8-10=6$$

$$C_I(8)=[C_I(6)+C_I(10)]/2$$

and $$C_Q(8)=[C_Q(6)+C_Q(10)]/2$$

In step 2, coefficient C(7) (point D, step 2) is calculated:

$$X=6; Y=8$$

$$Z=\text{FLOOR } [(6+8)/2]=7$$

$$W=2\cdot 7-8=6$$

$$C_I(7)=[C_I(6)+C_I(8)]/2$$

and $$C_Q(7)=[C_Q(6)+C_Q(8)]/2$$

In step 3, coefficient C(9) (point E, step 3) is calculated:

$$X=8; Y=10$$

$$Z=\text{FLOOR } [(8+10)/\mathbf{2}]=\mathbf{9}$$

$$W=2\cdot 9-10=8$$

$$C_I(9)=[C_I(8)+C_I(10)]/2$$

and $$C_Q(9)=[C_Q(8)+C_Q(10)]/2$$

Figure 9:
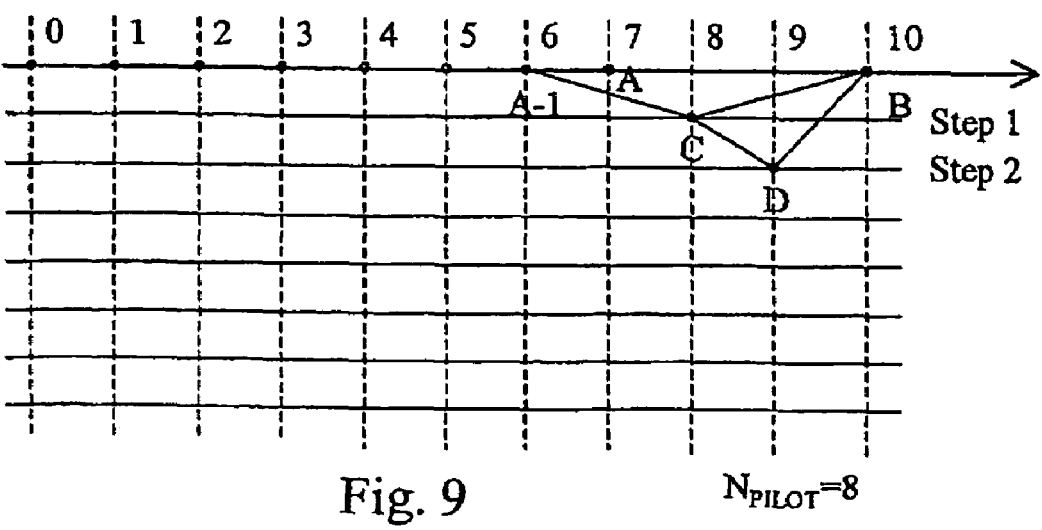
FIG. 9 is a schematic representation illustrating a sequence of operations for computing the channel coefficients through the algorithm of FIG. 3, when $N_{PILOT}=8$.

In FIG. 9 there is instead illustrated the last case in which each slot contains eight pilot symbols ($N_{PILOT}=8$) and the number of channel coefficients to be calculated is equal to two. This operation is carried out in two steps using coefficient C(6) which corresponds, in this case, to the last-but-one pilot symbol.

As a first step, coefficient C(8) (point C, step 1) is calculated:

X=6; Y=10

Z=FLOOR [(6+10)/2]=8

W=2·8−10=6

$C_I(8)=[C_I(6)+C_I(10)]/2$ and $C_Q(8)=[C_Q(6)+C_Q(10)]/2$

In step 2, coefficient C(9) (point D, step 2) is calculated:

X=8; Y=10

Z=FLOOR [(8+10)/2]=9

W=2·9−10=8

$C_I(9)=[C_I(8)+C_I(10)]/2$ and $C_Q(9)=[C_Q(8)+C_Q(10)]/2$

Also in this case the fact of using the channel coefficient corresponding to the last but one pilot symbol introduces a slight degradation in the overall system characteristics, however the computation of the interpolated coefficients is greatly simplified.

The six cases previously described and illustrated with reference to FIGS. 4 to 9, can be schematised in the state diagram shown in FIG. 10. The diagram of FIG. 10, whose sequence of operations essentially depends on the value of the $N_{PILOT}$ parameter, shows how it is possible to implement, by means of a simple state machine, a hardware or software device, which is the embodiment of the method of this invention. In the diagram there is shown only the phase component $C_I(k)$ of the channel components, owing to the fact that the formulas for the computation of the corresponding quadrature component $C_Q(k)$ are equivalent.

Figure 11:
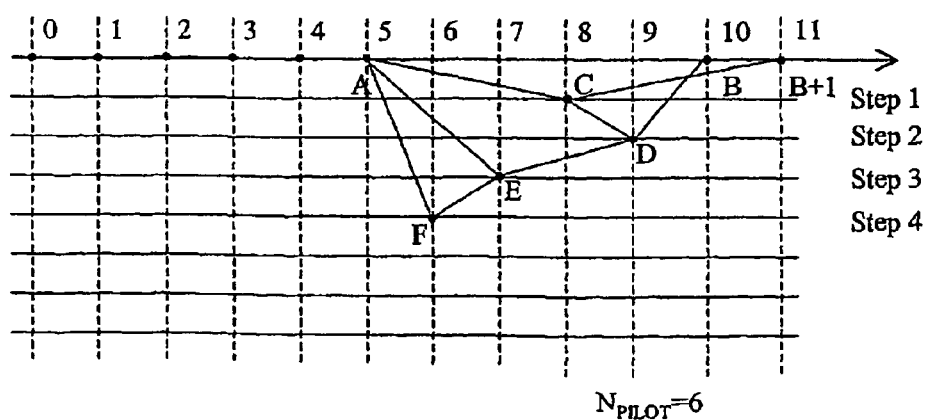
FIG. 11 is a schematic representation illustrating a sequence of operations for computing the channel coefficients through a second algorithm implemented according to the present invention, when $N_{PILOT}=6$.

In FIG. 11 there is shown instead an example of application, referred to the case $N_{PILOT}$=6, of a second method of interpolation implemented according to the present invention. In the example of FIG. 11, for the computation of a plurality of channel coefficients, corresponding to the abscissa positions 6 to 9, use is made of the known channel coefficients, corresponding to the last pilot symbol, of abscissa A, of the current slot L and to the first two pilot symbols, of abscissas B and B+1, of the slot L+1 subsequent to the current one.

To implement this second interpolation method, it is necessary to store an additional pilot symbol with respect to the cases previously described, namely the one of abscissa 11 (B+1), corresponding to the second pilot symbol of the subsequent slot.

To explain the sequence of steps illustrated in the application example of FIG. 11, and how the same method can be applied also to the remaining cases, from $N_{PILOT}$=3 to $N_{PILOT}$=8, we will now analyse in detail the second interpolation method, implemented according to the present invention.

This second method allows the computation, by interpolation, of a plurality of points comprised between a last channel coefficient, of abscissa A, of a current slot L, and the first two channel coefficients, of abscissas B and B+1, of a subsequent slot L+1.

By way of example, use will be made within this algorithm of some variables that have the same meaning of the variables previously used with reference to the algorithm of FIG. 3:

X: abscissa of the known left-hand point, used for the interpolation, a value which initially corresponds to A;

Y: abscissa of the known right-hand point of the interpolation interval, a value which initially corresponds to B;

Z: abscissa of an intermediate point between X and Y;

W: abscissa of the right-hand extreme point, actually used for the interpolation corresponding from time to time either to point Y or to point Y+1;

f(k): ordinate corresponding to a generic abscissa k.

The variables X and Y are initially set to be equal to the extremes A and B.

Subsequently, it goes on calculating the abscissa Z, obviously meant as an integer number, of the intermediate point between X and Y. The value of abscissa Z is rounded off to the higher integer through the function CEIL [(X+Y)/2]. Then calculation is made of the abscissa of the right-hand extreme point D, which is found to be equal to Y or Y+1, depending on whether the value of X+Y is even or odd, respectively, by means of the formula W=2·Z−X. The calculation is then carried out of the ordinate f(Z) of intermediate point Z by arithmetic averaging between the ordinate of the right-hand extreme point W and the ordinate of the left-hand extreme X, which are known.

Then the check is made on whether the point just calculated, of abscissa Z, corresponds to the point of abscissa Y−1. If this condition is met, the value of Z is assigned to variable X of the known left-hand point, and the operations of the preceding paragraph are applied again. In practice the above operations are recursively applied to each half-interval on the right-hand of the point previously calculated until the abscissa point Y−1 is reached.

Subsequently the procedure applied is by decreasing abscissas starting from the last calculated point Y−1 and searching for a first point still to be computed. If the left-hand extreme A of the interval is reached, the algorithm is terminated, since all the points have already been calculated.

If however a point still to be calculated has been found, the abscissa of which is equal to the value taken by variable Z, then the variable Y is assigned the value Z+1, which represents the first known right-hand point, and the search is made by subsequent attempts for the first known left-hand point of Z, a value which is assigned to variable X. To perform the latter operation, variable X is decreased each time by a unit, until a corresponding known coefficient is reached.

With the new values of X and Y, use is made again of the recursive algorithm for computing an intermediate point of abscissa Z and in cascade for the search procedure of a new point, still to be calculated. When all the points have been computed, the algorithm is terminated; otherwise a new interval X−Y is determined, to which the above recursive algorithm is to be applied.

Let us now analyse how the algorithm previously described is applied to the interpolation plan of FIG. 11.

As a first step, coefficient C(8) (point C, step 1) is calculated:

X=A=5; Y=B=10

Z=CEIL [(5+10)/2]=8

W=2·8−5=11

$$C_I(8)=[C_I(5)+C_I(11)]/2$$

and $$C_Q(8)=[C_Q(5)+C_Q(11)]/2$$

In step 2, coefficient C(9) (point D, step 2) is calculated:

$$X=8; Y=10$$

$$Z=\text{CEIL }[(8+10)/2]=9$$

$$W=2 \cdot 9-8=10$$

$$C_I(9)=[C_I(8)+C_I(10)]/2$$

and $$C_Q(9)=[C_Q(8)+C_Q(10)]/2$$

In step 3, coefficient C(7) (point E, step 3) is calculated:

$$X=5; Y=8$$

$$Z=\text{CEIL }[(5+8)/2]=7$$

$$W=2 \cdot 7-5=9$$

$$C_I(7)=[C_I(5)+C_I(9)]/2$$

and $$C_Q(7)=[C_Q(5)+C_Q(9)]/2$$

In step 4, coefficient C(6) (Point F, step 4) is calculated:

$$X=5; Y=7$$

$$Z=\text{FLOOR }[(5+7)/2]=6$$

$$W=2 \cdot 6-5=7$$

$$C_I(6)=[C_I(5)+C_I(7)]/2$$

and $$C_Q(6)=[C_Q(5)+C_Q(7)]/2$$

The algorithm described in the second interpolation method may be regarded as a "mirror" version of the algorithm previously described with reference to FIG. 3. As a matter of fact, this method, too, allows computations exclusively through additions, divisions by two and compare operations between registers, of any number of channel coefficients contained in an interval defined at the left side by a known coefficient (of abscissa A) and at the right side by two known coefficients (of abscissas B and B+1).

The two interpolation methods described above can be used in combination to implement a third method that might be advantageous in terms of speed of execution.

In the event in which there are available as known extremes of the interpolation interval two channel coefficients on the left-hand, of abscissa A−1 and A, and two known channel coefficients on the right-hand, of abscissa B and B+1, it is possible to apply "in parallel" both interpolation methods described above, in a left-hand sub-interval and in a right-hand sub-interval of the original interval, respectively. In fact it sufficient to calculate, as a first step, an average point C between the two extremes, A and B, of the interval, rounding up, if necessary, the abscissa of such point C to the next lower integer or to the next higher integer, indifferently, in order to define a left-hand sub-interval comprised among the abscissa points A−1, A and C and a right-hand sub-interval comprised among the abscissa points C and B, B+1. At this point it is possible to apply in parallel, by better exploiting therefore the hardware resources involved, the first interpolation method in the left-hand sub-interval and the second interpolation method in the right hand sub-interval, thus performing in parallel the computation of all the coefficients comprised in the interval.

Likewise it is possible to foresee an additional variation of the methods implemented according to the present invention; for instance it possible to apply for the interpolation, in place of the known channel coefficient immediately preceding the last known coefficient of the current slot or immediately following the first known coefficient of the subsequent slot, other known coefficients farther from the interpolation interval or a linear combination of the same.

As an example of use of a linear combination of known coefficients the case of three pilots ($N_{PILOT}$–3) is analysed. First a linear combination is performed of the three known pilots of the left hand group.

$$CL_I=C_I(2)/2+[C_I(0)+C_I(1)]/4$$

$$CL_Q=C_Q(2)/2+[C_Q(0)+C_Q(1)]/4,$$

and the result is assigned to coefficient C(2):

$$C_I(2)=CL_I$$

$$C_Q(2)=CL_Q$$

Also Coefficient C(1) is calculated as a linear combination of the same pilots:

$$CL_I=C_I(1)/2+[C_I(0)+C_I(2)]/4$$

$$CL_Q=C_Q(1)/2+[C_Q(0)+C_Q(2)]/4$$

The result is assigned to coefficient C(1).

$$C_I(1)=CL_I$$

$$C_Q(1)=CL_Q$$

A similar linear combination may be calculated on the basis of the pilots of the subsequent slot.

$$CL_I=C_I(10)/2+[C_I(11)+C_I(12)]/4$$

$$CL_Q=C_Q(10)/2+[C_Q(11)+C_Q(12)]/4,$$

and then assigned to coefficient C(10)

$$C_I(10)=CL_I$$

$$C_Q(10)=CL_Q$$

Linear combinations are so chosen as to be implemented in the form of sums and shifts of bits, in a similar way as has been illustrated for the interpolation.

The interpolation algorithm for the calculation of the missing coefficients can therefore be applied following the plan already illustrated for three pilots and reported in FIG. 4. This variation of the method is applicable in the extremely frequent case of the pilots being affected by noise: a linear combination, which represents a weighed average of the known channel coefficients, albeit affected by noise, provides a more reliable estimate of the known points for the interpolation.

Figure 12:
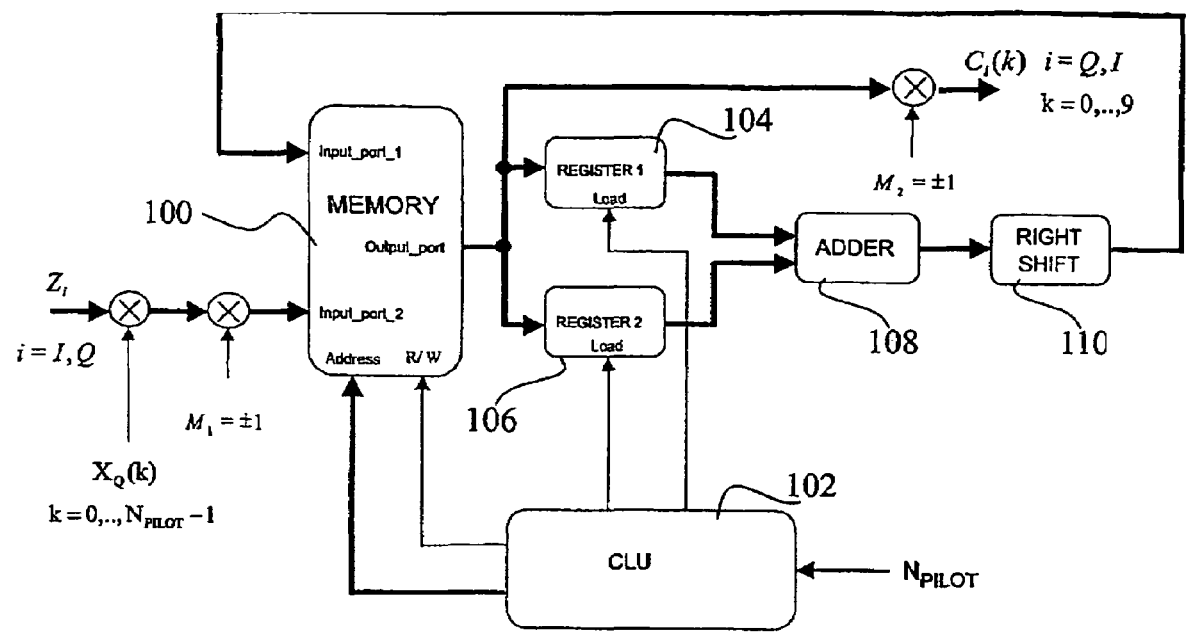
FIG. 12 is a block diagram of a circuit performing an interpolation algorithm, implemented according to the present invention.

The block diagram of FIG. 12 shows a possible hardware implementation of a device for the channel estimation according to the present invention, in case of a transmission path towards a radio base station and a spreading factor of the channel DPDCH equal to 256.

The device of FIG. 12, called CEU (Channel Estimation Unit), allows extension of the channel estimation to channel coefficients subsequent to the pilot symbols, by implementing one of the interpolation methods previously described.

The CEU unit receives at its input the channel symbols received after performing the operations of "descrambling", "despreading" with the code of channelling DPCCH and integration. The received pilot symbols which are supplied to the CEU unit are denoted by $Z_i(k)$, where subscript "i" indicates the signal component (i=I for the phase component or i=Q for the quadrature component).

The first operation performed by the CEU unit is the multiplication of the received pilot symbols by the reference pilot symbols $X_Q(k)$. As a matter of fact, the reference pilot symbols are known to the receiver. Subsequently it is necessary to invert the sign of the phase component. The sign inversion of the phase component is effected through multiplication by factor $M_1$, setting $M_1=-1$ for the phase component and $M_1=+1$ for the quadrature component, as shown in the diagram of FIG. 12.

Once the above operations have been carried out, the effect of the sequence of the pilot symbols is removed and the complex values obtained represent only the phase displacement introduced by the channel. These values are stored into memory 100 through the input denoted in FIG. 10 as Input_port_2.

When all the pilot symbols of the current slot and one or two initial pilot symbols, of the subsequent slot, depending on the method to be applied, have been received and stored into memory 100, the process of interpolation begins under the control of the CLU unit 102 (CLU=Control Logic Unit).

The logic control unit 102 is a finite state machine (FSM) that performs a predefined sequence of operations, as a function of input parameter $N_{PILOT}$ (corresponding to the number of pilot symbols present in the current slot). For instance, in case of the interpolation method previously described with reference to FIG. 3, the logic control unit 102 carries out the sequence of operations shown in the state diagram of FIG. 10.

The basic operation effected by the logic control unit 102 is divided into the following three steps:

reading the first operand from memory 100 and loading it into the first register 104;

reading the second operand from memory 100 and loading it into the second register 106;

writing the arithmetic average of the two operands into memory 100 through its Input_port_1.

The computation of the arithmetic average of the two operands requires an addition and a division by two; the sum is effected in adder 108 and the division by two in block 110 which carries out a right-hand shift, discarding in practice the less significant bit (LSB) of the data resulting from adder 108.

All the calculations to be carried out only require sums and right-hand shifts, that is operations which are easily implementable on hardware.

Figure 10:
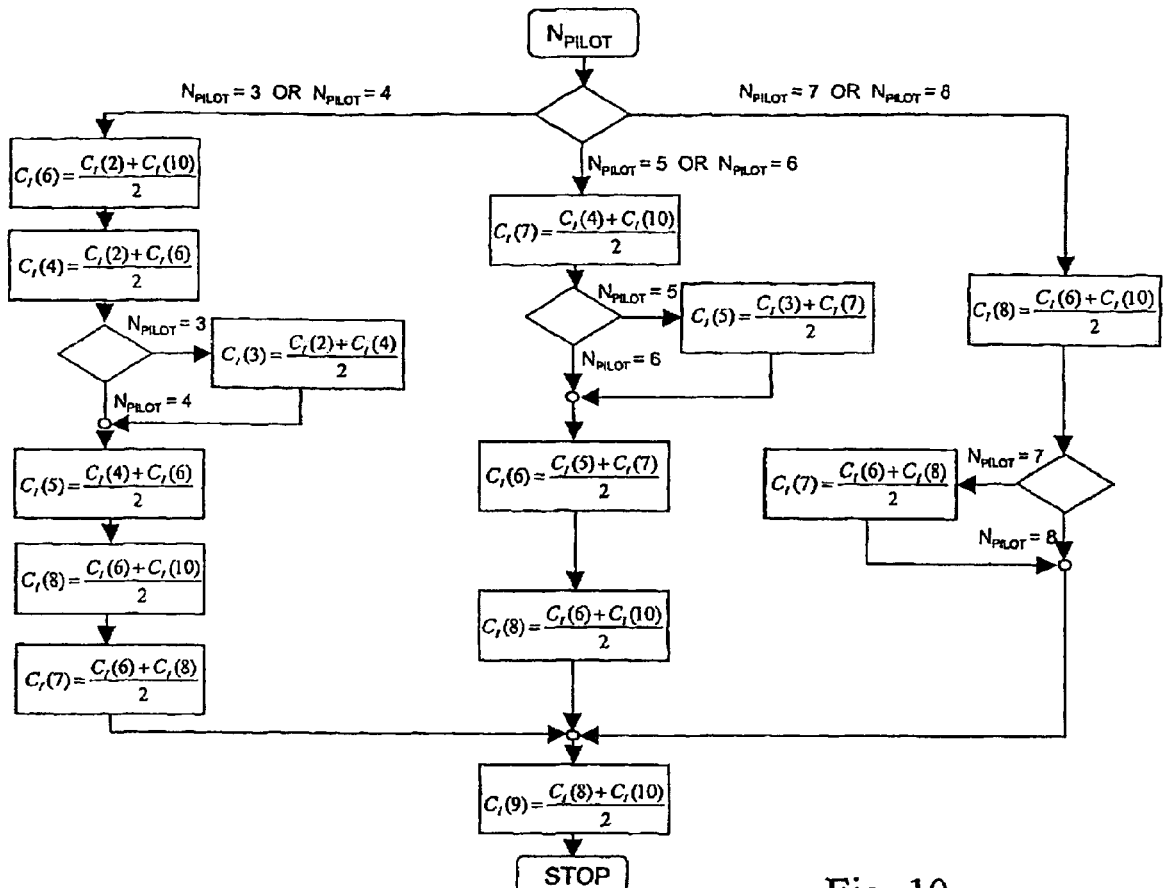
FIG. 10 is a state diagram summarising the operations required for computing the channel coefficients in the cases depicted in FIGS. 4 to 9.

When all channel coefficients $C_i(k)$, with k ranging from 0 to 9, have been computed, they are sequentially read from the memory and supplied to the CCU unit (Channel Compensation Unit), not shown in FIG. 10, since its function is well known to the man skilled in the art.

The multiplying factor shown in FIG. 12 as $M_2$ is required to invert the sign of the quadrature component and to provide the complex conjugate of the channel estimations to the channel compensation unit (CCU). M2 is equal to +1 for the phase component and to a −1 for the quadrature component.

The invention claimed is:

1. An iterative method of estimating channel coefficients by interpolation between known channel coefficients, the coefficients being identified by integer abscissa values on a time axis, the known coefficients comprising at least two coefficients with adjacent abscissa values A−1 and A at the left side of an interval and at least one coefficient with abscissa value B at the right of the interval, wherein one iteration of the method comprises calculating an abscissa value as z=FLOOR[(A+B)/2], and calculating the coefficient with abscissa z as the arithmetic mean of the coefficients with abscissae values A and B, if A+B is even, and as the arithmetic mean of the coefficients with abscissae values A−1 and B, if A+B is odd, the coefficient with abscissa z constituting a known coefficient for any further iterations.

2. The method according to claim 1 wherein said channel coefficients to be calculated are comprised between a first known channel coefficient, of abscissa A, corresponding to a last pilot symbol of a current slot (L) and a second known channel coefficient, of abscissa B, corresponding to a first pilot symbol of a slot (L+1) subsequent to said current slot, a third channel coefficient of abscissa A-i being on the left-hand of said first channel coefficient of abscissa A, and the computation of said channel coefficients being carried out by the following steps:

a) carrying out a first iteration in an interval defined by the known channel coefficients of abscissa A and B in which a first intermediate coefficient is calculated and performing subsequent iterations in sub-intervals defined each time on the left-hand by said known channel coefficient of abscissa A and on the right-hand by the intermediate coefficient and calculated in the preceding iteration, until the abscissa point A+1 is reached and computed;

b) searching, by increasing abscissas, for a first point, still to be calculated, on the right-hand of the last intermediate coefficient calculated; defining as extremes of a new interval having on the left side the first known left-hand point and on the right side the first known right-hand point with respect to said point still to be calculated; and further recursively performing further iterations of the method in said new interval by carrying out subsequent iteration in sub-intervals defined from time to time by the intermediate coefficient calculated in the preceding iteration, until the point immediately adjacent to the left-hand extreme of said new interval is reached and calculated; and c) repeating step b) until the channel coefficient associated to the value of abscissa B−1 is calculated.

3. Method according to claim 2, wherein each slot contains three pilot symbols (0, 1, 2), said first known channel coefficient of abscissa A is the coefficient $C(2)=C_I(2)+C_Q(2)$ corresponding to the last pilot symbol (2) of the current slot (L), said second known channel coefficient of abscissa B is the coefficient $C(10)=C_I(10)+jC_Q(10)$ corresponding to the first pilot symbol (10) of a subsequent slot (L+1), and said third known channel coefficient of abscissa A−1 is the coefficient $C(1)=C_I(1)+C_Q(1)$ corresponding to the last but one pilot symbol (1) of the current slot (L) and the computation of channel coefficients $C(k)=C_I(k)+C_Q(k)$, with k=3 . . . 9, is performed according to the following sequence, $C_I(k)$ being the in phase component of the channel coefficient C(k) and $C_Q(k)$ being the quadrature component of the channel coefficient C(k):

$$C_I(6)=[C_I(2)+C_I(10)]/2; \quad C_Q(6)=[C_Q(2)+C_Q(10)]/2;$$

$$C_I(4)=[C_I(2)+C_I(6)]/2; \quad C_Q(4)=[C_Q(2)+C_Q(6)]/2;$$

$$C_I(3)=[C_I(2)+C_I(4)]/2; \quad C_Q(3)=[C_Q(2)+C_Q(4)]/2;$$

$$C_I(5)=[C_I(4)+C_I(6)]/2; \quad C_Q(5)=[C_Q(4)+C_Q(6)]/2;$$

$C_I(8)=[C_I(6)+C_I(10)]/2; C_Q(8)=[C_Q(6)+C_Q(10)]/2;$ $C_I(7)=[C_I(6)+C_I(8)]/2; C_Q(7)=[C_Q(6)+C_Q(8)]/2;$ $C_I(9)=[C_I(8)+C_I(10)]/2; C_Q(9)=[C_Q(8)+C_Q(10)]/2.$

4. Method according to claim 2, wherein each slot contains four pilot symbols (0, 1, 2, 3), said first known channel coefficient of abscissa A is the coefficient $C(3)=C_I(3)+jC_Q(3)$ corresponding to the last pilot symbol (3) of the current slot (L), said second known channel coefficient of abscissa B is the coefficient $C(10)=C_I(10)+C_Q(10)$ corresponding to the first pilot symbol (10) of a subsequent slot (L+1), and said third known channel coefficient of abscissa A−1 is the coefficient $C(2)=C_I(2)+C_Q(2)$ corresponding to the last but one pilot symbol (2) of the current slot (L), and the computation of the channel coefficients $C(k)=C_I(k)+jC_Q(k)$, with k=4 . . . 9, is performed according to the following sequence, $C_I(k)$ being the in phase component of the channel coefficient C(k) and $C_Q(k)$ being the quadrature component of the channel coefficient C(k):

$C_I(6)=[C_I(2)+C_I(10)]/2; C_Q(6)=[C_Q(2)+C_Q(10)]/2;$ $C_I(4)=[C_I(2)+C_I(6)]/2; C_Q(4)=[C_Q(2)+C_Q(6)]/2;$ $C_I(5)=[C_I(4)+C_I(6)]/2; C_Q(5)=[C_Q(4)+C_Q(6)]/2;$ $C_I(8)=[C_I(6)+C_I(10)]/2; C_Q(8)=[C_Q(6)+C_Q(10)]/2;$ $C_I(7)=[C_I(6)+C_I(8)]/2; C_Q(7)=[C_Q(6)+C_Q(8)]/2;$ $C_I(9)=[C_I(8)+C_I(10)]/2; C_Q(9)=[C_Q(8)+C_Q(10)]/2.$

5. Method according to claim 2, wherein each slot contains five pilot symbols (0, 1, 2, 3, 4), said first known channel coefficient of abscissa A is the coefficient $C(4)=C_I(4)+jC_Q(4)$ corresponding to the last pilot symbol (4) of current slot (L), said second known channel coefficient of abscissa B is the coefficient $C(10)=C_I(10)+jC_Q(10)$ corresponding to the first pilot symbol (10) of a subsequent slot (L+1), and said third known channel coefficient of abscissa A−1 is the coefficient $C(3)=C_I(3)+jC_Q(3)$ corresponding to the last but one pilot symbol (3) of the current slot (L), and the computation of the channel coefficients $C(k)=C_I(k)+jC_Q(k)$, with k=5 . . . 9, is performed according to following sequence, $C_I(k)$ being the in phase component of the channel coefficient C(k) and $C_Q(k)$ being the quadrature component of the channel coefficient C(k):

$C_I(7)=[C_I(4)+C_I(10)]/2; C_Q(7)=[C_Q(4)+C_Q(10)]/2;$ $C_I(5)=[C_I(3)+C_I(7)]/2; C_Q(5)=[C_Q(3)+C_Q(7)]/2;$ $C_I(6)=[C_I(5)+C_I(7)]/2; C_Q(6)=[C_Q(5)+C_Q(7)]/2;$ $C_I(8)=[C_I(6)+C_I(10)]/2; C_Q(8)=[C_Q(6)+C_Q(10)]/2;$ $C_I(9)=[C_I(8)+C_I(10)]/2; C_Q(9)=[C_Q(8)+C_Q(10)]/2.$

6. Method according to claim 2, wherein each slot contains six pilot symbols (0, 1, 2, 3, 4, 5), said first known channel coefficient of abscissa A is the coefficient $C(5)=C_I(5)+jC_Q(5)$ corresponding to the last pilot symbol (5) of the current slot (L), said second known channel coefficient of abscissa B is the coefficient $C(10)=C_I(10)+C_Q(10)$ corresponding to the first pilot symbol (10) of a subsequent slot (L+1), and said third known channel coefficient of abscissa A−1 is the coefficient $C(4)=C_I(4)+jC_Q(4)$ corresponding to the last but one pilot symbol (4) of the current slot (L), and the computation of the channel coefficients $C(k)=C_I(k)+jC_Q(k)$, with k=6 . . . 9, is performed according to following sequence, $C_I(k)$ being the in phase component of the channel coefficient C(k) and $C_Q(k)$ being the quadrature component of the channel coefficient C(k):

$C_I(7)=[C_I(4)+C_I(10)]/2; C_Q(7)=[C_Q(4)+C_Q(10)]/2;$ $C_I(6)=[C_I(5)+C_I(7)]/2; C_Q(6)=[C_Q(5)+C_Q(7)]/2;$ $C_I(8)=[C_I(6)+C_I(10)]/2; C_Q(8)=[C_Q(6)+C_Q(10)]/2;$ $C_I(9)=[C_I(8)+C_I(10)]/2; C_Q(9)=[C_Q(8)+C_Q(10)]/2.$

7. Method according to claim 2, wherein each slot contains seven pilot symbols (0, 1, 2, 3, 4, 5, 6), said first known channel coefficient of abscissa A is the coefficient $C(6)=C_I(6)+jC_Q(6)$ corresponding to the last pilot symbol (6) of the current slot (L), said second known channel coefficient is the coefficient $C(10)=C_I(10)+jC_Q(10)$ corresponding to the first pilot symbol (10) of a subsequent slot (L+1), and said third known channel coefficient of abscissa A−1 is the coefficient $C(5)=C_I(5)+jC_Q(5)$ corresponding to the last but one pilot symbol (5) of the current slot (L), and the computation of the channel coefficients $C(k)=C_I(k)+jC_Q(k)$, with k=7 . . . 9, is performed following the sequence, $C_I(k)$ being the in phase component of the channel coefficient C(k) and $C_Q(k)$ being the quadrature component of the channel coefficient C(k):

$C_I(8)=[C_I(6)+C_I(10)]/2; C_Q(8)=[C_Q(6)+C_Q(10)]/2;$ $C_I(7)=[C_I(6)+C_I(8)]/2; C_Q(7)=[C_Q(6)+C_Q(8)]/2;$ $C_I(9)=[C_I(8)+C_I(10)]/2; C_Q(9)=[C_Q(8)+C_Q(10)]/2.$

8. Method according to claim 2, wherein each slot contains eight pilot symbols (0, 1, 2, 3, 4, 5, 6, 7), said first known channel coefficient of abscissa A is the coefficient $C(7)=C_I(7)+jC_Q(7)$ corresponding to the last pilot symbol (7) of the current slot (L), said second known channel coefficient of abscissa B is the coefficient $C(10)=C_I(10)+jC_Q(10)$ corresponding to the first pilot symbol (10) of a subsequent slot (L+1), and said third known channel coefficient of abscissa A−1 is the coefficient $C(6)=C_I(6)+jC_Q(6)$ corresponding to the last but one pilot symbol (6) of the current slot (L), and the computation of the channel coefficients $C(k)=C_I(k)+jC_Q(k)$, with k=8, 9, is performed according to the sequence, $C_I(k)$ being the in phase component of the channel coefficient C(k) and $C_Q(k)$ being the quadrature component of the channel coefficient C(k):

$C_I(8)=[C_I(6)+C_I(10)]/2; C_Q(8)=[C_Q(6)+C_Q(10)]/2;$ $C_I(9)=[C_I(8)+C_I(10)]/2; C_Q(9)=[C_Q(8)+C_Q(10)]/2.$

9. The method according to claim 1, wherein said channel coefficients to be calculated are comprised between two known left-hand channel coefficients (A+1, A) corresponding to the last two pilot symbols of a current slot (L), and two known right-hand channel coefficients (B, B+1) corresponding to the first two pilot symbols of a slot (L+1) subsequent to said current slot, and the computation of said channel coefficients is performed by applying the first time iterative method of claim 16 for calculating an intermediate coefficient, thus dividing into two sub-intervals the interval comprised between said known left-hand channel coefficients and said known right hand channel coefficients, and by subsequently applying in parallel to said the iterative method of claim 16 for computing the remaining channel coefficients comprised in each of said sub-intervals.

10. The method according to claim 1 wherein at least one known point of said first or second extreme is a point which has been obtained through a linear combination of known channel coefficients.

11. The method according to claim 1 wherein said communications network is a radio mobile telecommunications network of UMTS type.

12. A device for the estimation of the transfer function of a transmission channel in a receiving system for a telecommunications network, the device comprising:
a memory means for storing channel coefficients corresponding to a current slot (L) and at least one channel coefficient corresponding to a slot (L+1) subsequent to said current slot (L);
interpolation means for reading from said memory means first and second operands corresponding to known channel coefficients and for writing into said memory means a value corresponding to the arithmetic average between said first and second operand, said value corresponding to a new channel coefficient;
logic control means for addressing in reading and writing (R/W) said memory means and for controlling said interpolation means so as to perform through individual interpolation operations the computation and the storage into such memory means of individual channel coefficients, said logic control carrying out a series of interpolation operations according to the method described in claim 1.

13. A radio base station of the type comprising a Rake receiver for receiving signals coming from mobile terminals and equipped with a device for the estimation of the transfer function of a transmission channel through the computation of a plurality of channel coefficients, the estimation of the transfer function being performed according to the method described in claim 1.

14. A mobile terminal of the type comprising a receiver for the reception of signals coming from a radio base station and equipped with a device for the estimation of the transfer function of a transmission channel through the computation of a plurality of channel coefficients, the estimation of the transfer function being performed according to the method described in claim 1.

15. An iterative method of estimating channel coefficients by interpolation between known channel coefficients, the coefficients being identified by integer abscissa values on a time axis, the known coefficients comprising at least one coefficients with adjacent abscissa values A at the left side of an interval and at least two coefficients with abscissa values B and B+1 at the right of the interval, wherein one iteration of the method comprises
calculating an abscissa value as $z=\mathrm{CEIL}[(A+B)/2]$, and
calculating the coefficient with abscissa z as the arithmetic mean of the coefficients with abscissae values A and B, if A+B is even, and as the arithmetic mean of the coefficients with abscissae values A and B+1, if A+B is odd, the coefficient with abscissa z constituting a known coefficient for any further iterations.

16. The method according to claim 15 wherein said channel coefficients to be calculated are comprised between a first known channel coefficient of abscissa A, corresponding to a last pilot symbol of a current slot (L), and a second known channel coefficient of abscissa B, corresponding to a first pilot symbol of a slot (L+1) subsequent to said current slot, a third channel coefficient of abscissa B+1 being on the right hand of said first channel coefficient of abscissa B, and the computation of said channel coefficients is performed by the steps of:
a) carrying out a first iteration in the interval defined by the known channel coefficients of abscissa A and B in which a first intermediate coefficient is calculated and performing subsequent iterations in sub-intervals defined from time to time on the right-hand by said known channel coefficient of abscissa B and on the left-hand by the intermediate coefficient calculated in the preceding iteration, until the abscissa point B−1 is reached and calculated;
b) searching, by decreasing abscissas, for a first point still to be calculated on the left-hand of the last intermediate coefficient calculated; defining a new interval having on the left side the first known left hand point and on the right side the first known right-hand point with respect to said point still to be calculated; and recursively calculating further iterations of the method in said new interval by carrying out subsequent iterations in sub-intervals defined from time to time by the right hand extreme of said new interval and by a left hand extreme formed by the intermediate coefficient derived in the previous iteration, until the point immediately adjacent to the right hand extreme of said new interval is reached and calculated; and
c) repeating step b) until the channel coefficient associated to the value of abscissa A+1 is calculated.

17. A device for the estimation of the transfer function of a transmission channel in a receiving system for a telecommunications network, the device comprising:
a memory means for storing channel coefficients corresponding to a current slot (L) and at least one channel coefficient corresponding to a slot (L+1) subsequent to the current slot (L);
interpolation means for reading from the memory means first and second operands corresponding to known channel coefficients and for writing into the memory means a value corresponding to the arithmetic average between the first and second operand, the value corresponding to a new channel coefficient;
logic control means for addressing in reading and writing (R/W) the memory means and for controlling the interpolation means so as to perform through individual interpolation operations the computation and the storage into such memory means of individual channel coefficients, the logic control carrying out a series of interpolation operations according to the method described in claim 15.

18. A radio base station of the type comprising a Rake receiver for receiving signals coming from mobile terminals and equipped with a device for the estimation of the transfer function of a transmission channel through the computation of a plurality of channel coefficients, the estimation of the transfer function being performed according to the method described in claim 15.

19. A mobile terminal of the type comprising a receiver for the reception of signals coming from a radio base station and equipped with a device for the estimation of the transfer function of a transmission channel through the computation of a plurality of channel coefficients, the estimation of the transfer function being performed according to the method described in claim 15.

* * * * *